(12) United States Patent
Yamazaki et al.

(10) Patent No.: US 11,646,406 B2
(45) Date of Patent: May 9, 2023

(54) NEGATIVE ELECTRODE MATERIAL FOR LITHIUM-ION SECONDARY BATTERY AND METHOD FOR PRODUCING NEGATIVE ELECTRODE MATERIAL FOR LITHIUM-ION SECONDARY BATTERY

(71) Applicant: TOKAI CARBON CO., LTD., Tokyo (JP)

(72) Inventors: Toshiki Yamazaki, Tokyo (JP); Yoshiho Masuda, Tokyo (JP)

(73) Assignee: TOKAI CARBON CO., LTD., Tokyo (JP)

( * ) Notice: Subject to any disclaimer, the term of this patent is extended or adjusted under 35 U.S.C. 154(b) by 305 days.

(21) Appl. No.: 16/955,340

(22) PCT Filed: Dec. 19, 2018

(86) PCT No.: PCT/JP2018/046743
§ 371 (c)(1),
(2) Date: Jun. 18, 2020

(87) PCT Pub. No.: WO2019/124425
PCT Pub. Date: Jun. 27, 2019

(65) Prior Publication Data
US 2021/0020906 A1     Jan. 21, 2021

(30) Foreign Application Priority Data
Dec. 22, 2017  (JP) .............................. JP2017-246208

(51) Int. Cl.
*H01M 4/133*  (2010.01)
*H01M 4/04*   (2006.01)
(Continued)

(52) U.S. Cl.
CPC ......... *H01M 4/133* (2013.01); *H01M 4/0471* (2013.01); *H01M 4/1393* (2013.01);
(Continued)

(58) Field of Classification Search
CPC .. H01M 4/133; H01M 4/0471; H01M 4/1393; H01M 4/587; H01M 10/0525;
(Continued)

(56) References Cited

U.S. PATENT DOCUMENTS

2002/0006376 A1   1/2002  Ishii et al.
2013/0130127 A1   5/2013  Sotowa et al.
(Continued)

FOREIGN PATENT DOCUMENTS

CN   103053054 A   4/2013
CN   103262314 A   8/2013
(Continued)

OTHER PUBLICATIONS

English Translation of JP2014-060124 (Year: 2014).*
(Continued)

*Primary Examiner* — Andrew J. Oyer
(74) *Attorney, Agent, or Firm* — WHDA, LLP

(57) ABSTRACT

A negative electrode material for a lithium-ion secondary battery is disclosed which contains a mass of graphite particle spherical aggregates in which a plurality of flat graphite particles are aggregated. The mass of the graphite particle spherical aggregates has an average circularity, $D_{90}/D_{10}$, and a crystallite size Lc (004) within a predetermined range, and the proportion of the graphite particle spherical aggregates in which the largest flat graphite particle observed on the outermost surface has a circle equivalent diameter of 2 μm to 12 μm in graphite particle spherical aggregates having a circle equivalent diameter of 10 μm or more when observed by SEM is 80% or more.

5 Claims, 3 Drawing Sheets

(51) Int. Cl.
*H01M 4/1393* (2010.01)
*H01M 4/587* (2010.01)
*H01M 10/0525* (2010.01)
*H01M 4/02* (2006.01)

(52) U.S. Cl.
CPC ....... *H01M 4/587* (2013.01); *H01M 10/0525* (2013.01); *H01M 2004/027* (2013.01)

(58) Field of Classification Search
CPC ............. H01M 2004/027; H01M 4/362; C01P 2002/60; C01P 2004/32; C01P 2004/51; C01P 2002/77; C01P 2004/50; C01B 32/205; Y02E 60/10
See application file for complete search history.

(56) References Cited

U.S. PATENT DOCUMENTS

| | | |
|---|---|---|
| 2013/0140488 A1 | 6/2013 | Sotowa et al. |
| 2013/0224598 A1 | 8/2013 | Kameda et al. |
| 2013/0302675 A1 | 11/2013 | Kouzu et al. |
| 2014/0212750 A1 | 7/2014 | Ahn et al. |
| 2017/0110729 A1* | 4/2017 | Tsuchiya ............... H01M 4/587 |
| 2018/0241076 A1 | 8/2018 | Nishiura et al. |

FOREIGN PATENT DOCUMENTS

| | | | |
|---|---|---|---|
| JP | 10-158005 | A | 6/1998 |
| JP | 3213575 | B2 | 10/2001 |
| JP | 2012-94505 | A | 5/2012 |
| JP | 5162093 | B2 | 3/2013 |
| JP | 2014-60124 | A | 4/2014 |
| JP | 2014060124 | A * | 4/2014 |
| JP | 2014-528631 | A | 10/2014 |
| JP | 2017-63040 | A | 3/2017 |
| JP | 2017-126426 | A | 7/2017 |
| WO | 2012/017676 | A1 | 2/2012 |
| WO | 2012/017677 | A1 | 2/2012 |
| WO | 2012/043666 | A1 | 4/2012 |
| WO | 2017/022734 | A1 | 2/2017 |

OTHER PUBLICATIONS

International Search Report dated Mar. 26, 2019, issued in counterpart International Application No. PCT/JP2018/046743. (2 pages).
Extended (Supplementary)European Search Report dated Sep. 24, 2021, issued in counterpart EP Application No. 18892217.3. (8 pages).
Office Action dated Sep. 20, 2022, issued in counterpart CN application No. 201880082988.7, with English translation. (23 pages).

* cited by examiner

NEGATIVE ELECTRODE MATERIAL FOR LITHIUM-ION SECONDARY BATTERY AND METHOD FOR PRODUCING NEGATIVE ELECTRODE MATERIAL FOR LITHIUM-ION SECONDARY BATTERY

TECHNICAL FIELD

The present invention relates to a negative electrode material for a lithium-ion secondary battery and a method for producing a negative electrode material for a lithium-ion secondary battery.

BACKGROUND ART

Lithium-ion secondary batteries are used in many devices, such as mobile phones and PCs, and are used in a wide variety of fields due to their high capacity, high voltage, small size, and light weight.

In recent years, demand for lithium-ion rechargeable batteries for automotive applications has been increasing rapidly, and there are high capacity, long lifetime, and high input/output as characteristics required for use in automobiles, and these characteristics are required to be well-balanced. Therefore, there is a need for a negative electrode material having high energy density with little expansion and contraction, and thus negative electrode materials made of graphite particles have been widely used as negative electrode material satisfying these characteristics.

It is generally known that when graphite particles are used as a constituent material of a negative electrode material for a lithium-ion secondary battery, the higher the crystallinity of the graphite particles, the higher the capacity and the longer the lifetime by suppressing the expansion and contraction of the particles.

Natural graphite having high crystallinity has excellent capacity characteristics per weight, but the expansion and contraction due to the intercalation of lithium ions into the graphite layers is biased in the c-axis direction, so in the case of a high-density negative electrode, internal fracture is likely to occur and the lifetime characteristics are likely to deteriorate.

Therefore, the use of a negative electrode material comprising artificial graphite has been studied for automotive applications where both capacity and lifetime characteristics are important.

As a negative electrode material for a lithium-ion secondary battery having such characteristics, Patent Literature 1 (Japanese Patent No. 5162093) discloses a negative electrode material for a lithium-ion secondary battery comprising a graphite material obtained by pulverizing and graphitizing petroleum-based green coke (non-needle coke), and that by using such a negative electrode material, a lithium-ion secondary battery excellent in initial efficiency and discharge capacity can be obtained.

Further, Patent Literature 2 (Japanese Patent No. 3213575) discloses a negative electrode material for a lithium-ion secondary battery comprising a graphite material having an indefinite shape obtained by firing coke powder in the presence of a graphitization catalyst such as silicon carbide and pulverizing the fired coke powder in which a plurality of flat particles are agglomerated or bonded so that the orientation planes become non-parallel, and that by using such a negative electrode material, a lithium-ion secondary battery excellent in cycle characteristics and rapid charge/discharge characteristics can be obtained.

CITATION LIST

Patent Literature

[Patent Literature 1] Japanese Patent No. 5162093
[Patent Literature 2] Japanese Patent No. 3213575

SUMMARY OF INVENTION

Technical Problem

However, as a result of studies by the present inventors, it has been found that while negative electrode materials are usually mixed with a binder and applied onto a copper foil that serves as a current collector, dried, and pressed to form an electrode when incorporated into a battery, the negative electrode material for a lithium-ion secondary battery described in Patent Literature 1 has a low electrode plate density and low energy density because the particles after graphitization are hard and hardly deformed when pressed.

Further, as a result of studies by the present inventors, it has been found that if a certain pressing pressure or more is applied when incorporated into a battery, the negative electrode material for a lithium-ion secondary battery described in Patent Literature 2 is excessively crushed, and the particles are deformed inside the negative electrode material so that not only the orientation planes of the primary particles which have been non-parallel are aligned, but also the electrolytic solution flow path between graphite particles are blocked, thereby increasing the resistance of the entire negative electrode.

As described above, lithium-ion secondary batteries are required to have high capacity and long lifetime, and a negative electrode material using artificial graphite is thus required to have a certain electrode plate density or more so as to increase the energy density and improve the discharge capacity, and further, it is desired that the orientation of graphite constituting the negative electrode material is non-parallel in order to improve the cycle characteristics (lifetime characteristics). Therefore, a material having a sufficient strength capable of maintaining the electrolytic solution flow path and maintaining that the orientation of graphite is non-parallel when pressed to form an electrode while being deformed such that the graphite particles reach a certain density or more is required.

As the graphite particles that can form such a negative electrode material, graphite particles having a particle morphology controlled to a specific shape have been considered, but the morphology of graphite particles has only been evaluated by laser diffraction particle size distribution analyzer to the extent of evaluating the average particle size, and the method of controlling the particle morphology to a specific shape and specifying the shape itself has not been sufficiently established.

Under such circumstances, an object of the present invention is to provide a negative electrode material for a secondary battery having a specific morphology having a sufficient strength capable of maintaining the electrolytic solution flow path and maintaining the non-parallel orientation of graphite when pressed during electrode formation while being deformed such that the graphite particles reach a certain density or more, and thus capable of increasing electrode density and discharge capacity and excellent in cycle characteristics (lifetime characteristics) and to provide a method for producing a negative electrode material for a lithium-ion secondary battery.

Solution to Problem

Under the above knowledges, the present inventors have further studied and found that it is possible to solve the above technical problems with a negative electrode material for a lithium-ion secondary battery comprising a mass of graphite particle spherical aggregates in which a plurality of flat graphite particles are aggregated in a spherical shape, wherein the mass of the graphite particle spherical aggregates has (i) an average circularity of 0.900 or more, (ii) a ratio of 90% cumulative particle size $D_{90}$ in volume-based cumulative particle size distribution to 10% cumulative particle size $D_{10}$ in volume-based cumulative particle size distribution of 2.0 to 3.5, (iii) a crystallite size Lc (004) of 40 nm to 100 nm, and (iv) a proportion of the graphite particle spherical aggregates in which the largest flat graphite particle observed on their outermost surface has a circle equivalent diameter of 2 μm to 12 μm within the graphite particle spherical aggregates having a circle equivalent diameter of 10 μm or more when observed by a scanning electron microscope of 80% or more in terms of number, thereby completing the present invention based on the finding.

That is, the present invention provides:

(1) a negative electrode material for a lithium-ion secondary battery comprising a mass of graphite particle spherical aggregates in which a plurality of flat graphite particles are aggregated in a spherical shape, wherein the mass of the graphite particle spherical aggregates has:

(i) an average circularity of 0.900 or more;

(ii) a ratio of 90% cumulative particle size $D_{90}$ in volume-based cumulative particle size distribution to 10% cumulative particle size $D_{10}$ in volume-based cumulative particle size distribution of 2.0 to 3.5;

(iii) a crystallite size Lc (004) in the c-axis direction of graphite constituting the graphite particle spherical aggregates of 40 nm to 100 nm; and (iv) a proportion of the graphite particle spherical aggregates in which the largest flat graphite particle observed on their outermost surface has a circle equivalent diameter of 2 μm to 12 μm within the graphite particle spherical aggregates having a circle equivalent diameter of 10 μm or more when observed by a scanning electron microscope of 80% or more in terms of number;

(2) the negative electrode material for a lithium-ion secondary battery according to (1), wherein the flat graphite particles are a graphitized product of flat particles constituting a green needle coke or calcined needle coke;

(3) the negative electrode material for a lithium-ion secondary battery according to (1) or (2), wherein the graphite particle spherical aggregate is (i) a graphitized product of a granulated product of a green needle coke or calcined needle coke and an organic binder in the absence of a graphitization catalyst, or (ii) a graphitized product of a granulated carbonized product obtained by carbonizing a granulated product of a green needle coke or calcined needle coke and an organic binder in the absence of a graphitization catalyst;

(4) a method for producing a negative electrode material for a lithium-ion secondary battery comprising a mass of graphite particle spherical aggregates in which a plurality of flat graphite particles are aggregated in a spherical shape, the method comprising:

(a) a step of mixing a green needle coke or calcined needle coke and an organic binder to obtain a granulated product; and (b) a step of graphitizing in the absence of a graphitization catalyst, the granulated product or a granulated carbonized product obtained by carbonizing the granulated product to obtain a graphitized product; and (5) the method for producing a negative electrode material for a lithium-ion secondary battery according to (4), wherein the granulated carbonized product is obtained by heating the granulated product at 500 to 1500° C.

Advantageous Effects of Invention

According to the present invention, the negative electrode material for a lithium-ion secondary battery comprises a mass comprising, with a narrow particle size distribution, graphite particle spherical aggregates having a high circularity formed by aggregating a plurality of flat graphite particles having a specific crystallite size and in which flat graphite particles having a certain circle equivalent diameter are observed on the outermost surface when observed by a scanning electron microscope. Therefore, when pressed to form an electrode, pressure can be suitably applied to easily increase the density, and it is possible to exert an excellent strength capable of exerting a certain resistance to maintain non-parallel orientation of the flat graphite, as well as to easily form gaps suitable as electrolytic solution flow path between the graphite particle spherical aggregates.

Therefore, according to the present invention, it is possible to provide a negative electrode material for a lithium-ion secondary battery with excellent electrolytic solution permeability, which is capable of improving the discharge capacity by increasing the electrode density and improving the cycle characteristics (lifetime characteristics) by achieving high orientation of the electrode plate, as well as a simple method for producing the negative electrode material for a lithium-ion secondary battery.

DESCRIPTION OF EMBODIMENTS

A negative electrode material for a lithium-ion secondary battery of the present invention comprises a mass of graphite particle spherical aggregates in which a plurality of flat graphite particles are aggregated in a spherical shape, wherein the mass of the graphite particle spherical aggregates has (i) an average circularity of 0.900 or more, (ii) a ratio of 90% cumulative particle size D90 in volume-based cumulative particle size distribution to 10% cumulative particle size $D_{10}$ in volume-based cumulative particle size distribution of 2.0 to 3.5, (iii) a crystallite size Lc (004) of 40 nm to 100 nm, and (iv) a proportion of the graphite particle spherical aggregates in which the largest flat graphite particle observed on their outermost surface has a circle equivalent diameter of 2 μm to 12 μm within the graphite particle spherical aggregates having a circle equivalent diameter of 10 μm or more when observed by a scanning electron microscope of 80% or more in terms of number.

The negative electrode material for a lithium-ion secondary battery of the present invention comprises a mass of graphite particle spherical aggregates in which a plurality of flat graphite particles are aggregated in a spherical shape.

Figure 2:
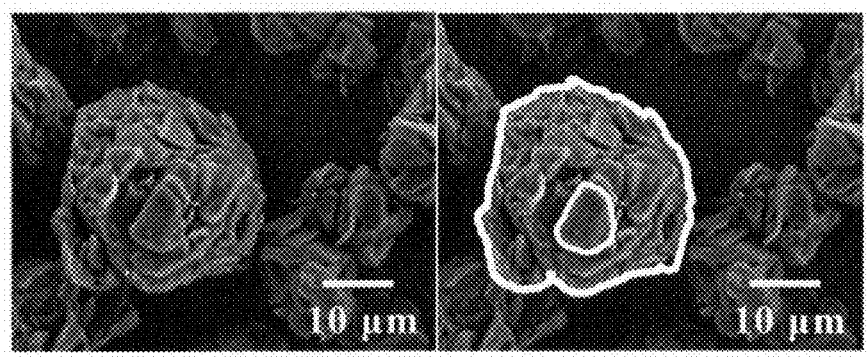
FIG. 2 is a scanning electron microscope (SEM) image of a graphite particle spherical aggregate obtained in an example of the present invention.

FIG. 2 is a scanning electron microscope (SEM) image of an example of a graphite particle spherical aggregate formed by aggregating a plurality of flat graphite particles constituting the negative electrode material for a lithium-ion secondary battery of the present invention.

The SEM images shown on the left side and the right side of FIG. 2 are the same, but the SEM image shown on the right side of FIG. 2 shows that the outer periphery of the graphite particle spherical aggregate shown in the center portion is enclosed with a white outline and the outer periphery of the largest particle among flat graphite particles that can be observed on the outermost surface of the graphite particle spherical aggregate is enclosed with a white outline.

As is clear from FIG. 2, the graphite particle spherical aggregates constituting the negative electrode material for a lithium-ion secondary battery of the present invention are those in which a plurality of flat graphite particles are aggregated to form a spherical shape, and the plurality of flat graphite particles are aggregated in a spherical shape in such a way that the orientation planes thereof are non-parallel, as shown in the figure.

In the negative electrode material for a lithium-ion secondary battery of the present invention, when the volume-based cumulative particle size distribution is measured using a laser diffraction particle size distribution analyzer, the flat graphite particles constituting the graphite particle spherical aggregate preferably have a 50% cumulative average particle size ($D_{50}$) of 4 μm to ≤20≤μm, more preferably of 5 μm to 15 μm, and still more preferably of 6 μm to 12 μm.

In the negative electrode material for a lithium-ion secondary battery of the present invention, when the flat graphite particles have an average particle size within the above ranges, spheroidization is facilitated, and graphite particle spherical aggregate having a desired shape can be easily formed, and at the same time, the electrode density is improved during electrode formation, and the energy density is easily increased.

Here, when the average particle size of the flat graphite particles is within the above range and the proportion of the graphite particle spherical aggregates in which the largest flat graphite particle observed on their outermost surface has a circle equivalent diameter of 2 μm to 12 μm within the graphite particle spherical aggregates having a circle equivalent diameter of 10 μm or more when observed by a scanning electron microscope of 80% or more in terms of number, the electrolytic solution flow path inside can be widened when used as a negative electrode material and the discharge capacity can be easily maintained even at high speed charging. Further, the increase in contact points makes it difficult for the current flow path to be interrupted due to expansion and contraction during charging and discharging, thus making it easier to improve the cycle characteristics.

In the negative electrode material for a lithium-ion secondary battery of the present invention, the flat graphite particles are preferably a graphitized product of flat particles constituting a green needle coke or calcined needle coke. Specific examples thereof include those obtained by graphitizing a pulverized product of green needle coke or calcined needle coke, and those obtained by pulverizing a graphitized product of green needle coke or calcined needle coke.

In the negative electrode material for a lithium-ion secondary battery of the present invention, when the flat graphite particles are a graphitized product of flat particles constituting a green needle coke or calcined needle coke, graphite particle spherical aggregates having a desired shape can be easily formed.

Details of the green needle coke or calcined needle coke will be described later.

In the negative electrode material for a lithium-ion secondary battery of the present invention, the graphite particle spherical aggregates are formed by aggregating flat graphite particles.

Here, the expression "flat graphite particles are aggregated" means that the flat graphite particles are aggregated by chemical interaction with each other or via a graphitized product of an organic binder, and have a strength enough to maintain the aggregated state before and after the measurement by scanning electron microscope observation.

Further, in the negative electrode material for a lithium-ion secondary battery of the present invention, the graphite particle spherical aggregates are those in which the orientation planes are non-parallel, and the degree of non-parallelism in the orientation planes of the flat graphite particles can be expressed by the electrode plate orientation ratio before pressing, and the electrode plate orientation ratio before pressing is preferably 0.1 or more, more preferably 0.15 or more, and still more preferably and 0.2 or more.

When the electrode plate orientation ratio before pressing of the graphite particle spherical aggregate is within the above ranges, the orientation direction of the orientation plane of each flat graphite particle constituting the graphite particle spherical aggregate becomes random, and the expansion direction when charging the battery is not biased and excellent lifetime characteristics can thus be easily exerted when used as an electrode material.

Here, in the present application, the electrode plate orientation ratio before pressing means the peak intensity I(110) derived from the carbon (110) plane to the peak intensity I (004) derived from the carbon (004) plane (peak intensity ratio I(110)/I(004)) obtained by measurement by the X-ray diffraction method described in (2) below from an electrode sheet before pressing, which is produced by the method described in (1) below from a mass of graphite particle spherical aggregates.

(1) Method for Producing Electrode Sheet

An organic binder polyvinylidene fluoride (PVDF) dissolved in N-methyl-2pyrrolidone in an amount of 10 weight % in solid content is added to graphite particle spherical aggregates in an amount of 90 weight %, and the mixture is stirred and mixed to prepare a negative electrode mixture paste.

The obtained negative electrode mixture paste is applied onto a copper foil (current collector) having a thickness of 18 μm with a doctor blade, and then heated to 130° C. in vacuum to completely volatilize the solvent, thereby obtaining an electrode sheet having a basis weight of 15.0±0.4 mg/cm² (here, the basis weight means the weight of the graphite particle spherical aggregate per unit area of the electrode sheet).

(2) Measurement of Electrode Plate Orientation Ratio

The electrode sheet obtained in (1) was fixed on a glass plate with double-sided tape, and the wide-angle X-ray diffraction curve was measured using CuKα rays monochromated with a graphite monochromator using an X-ray diffractometer (Ultima IV manufactured by Rigaku Corporation). The slits and measurement conditions are as follows. Here, 2θ represents the diffraction angle.

Slit: Divergence slit=2/3 degrees, Light receiving slit=0.15 mm, Scattering slit=2/3 degrees Measuring range and step angle/measuring time:
(110) plane: 76.0 degrees ≤2θ≤79.0 degrees 0.01 degrees/3 seconds
(004) plane: 53.0 degrees ≤2θ≤56.0 degrees 0.01 degrees/3 seconds The obtained chart was subjected to fitting by using a split pseudo-Voigt function as a profile function to separate the peaks, and the integrated intensities of the peaks from the (110) plane and the (004) plane were calculated. Next, the ratio of the diffraction intensity of the (110) plane to the diffraction intensity of the (004) plane (electrode plate orientation ratio I(110)/I(004)) is determined. The arithmetic mean value when the measurement is repeated 5 times is taken as the electrode plate orientation ratio before pressing.

In the negative electrode material for a lithium-ion secondary battery of the present invention, the graphite particle spherical aggregates are formed by aggregating flat graphite particles, and the cycle characteristics (battery lifetime) of the secondary battery can thus be easily improved.

In the negative electrode material for a lithium-ion secondary battery of the present invention, the graphite particle spherical aggregates are preferably formed by aggregating three or more flat graphite particles.

In the negative electrode material for a lithium-ion secondary battery of the present invention, the mass of graphite particle spherical aggregates has an average circularity of 0.900 or more, preferably 0.910 or more, and more preferably 0.915 or more.

Since the average circularity in the mass of the graphite particle spherical aggregates is 0.900 or more, the electrode density can be increased, and the orientation planes of the flat graphite particles constituting the graphite particle spherical aggregates can be maintained non-parallel even at high electrode densities.

In the present application, the average circularity in the mass of the graphite particle spherical aggregate means a value determined by the following method.

That is, about ≤20≤mg of graphite particle spherical aggregate powder is measured in the LPF measurement mode using a standard imaging unit of a flow-type particle image analyzer (FPIA-3000, manufacture by Spectris Co., Ltd). Next, after converting the projected area of each graphite particle spherical aggregate into a circle, for each 10,000 to 50,000 graphite aggregates having a circle equivalent diameter of 8 μm to 160 μm, the "perimeter of circle having area equal to projected area of graphite particle spherical aggregate/perimeter of projected image of graphite particle spherical aggregate" is calculated according to Wadell's equation, and the arithmetic mean value thereof is taken as the average circularity.

In the negative electrode material for a lithium-ion secondary battery of the present invention, the average circularity in the mass of the graphite particle spherical aggregates is 0.900 or more, and thus the sphericity is excellent, and it is possible to exert a sufficient strength capable of exerting a certain resistance to the applied pressure to maintain the electrolytic solution flow path and maintain the non-parallel orientation of the flat graphite constituting the graphite particle spherical aggregates when pressed to form an electrode while being deformed such that the graphite particle spherical aggregates reach a certain density or more.

In the negative electrode material for a lithium-ion secondary battery of the present invention, the mass of the graphite particle spherical aggregates preferably has a 10% cumulative particle size ($D_{10}$) in volume-based cumulative particle size distribution of 4 μm to 18 μm, more preferably of 6 μm to 16 μm, and still more preferably of 8 μm to 14 μm.

When $D_{10}$ of the mass of the graphite particle spherical aggregates is within the above ranges, good initial charge/discharge efficiency can be easily exerted when used as an electrode material.

Further, in the negative electrode material for a lithium-ion secondary battery of the present invention, the mass of the graphite particle spherical aggregates preferably has a 50% cumulative particle size ($D_{50}$) in volume-based cumulative particle size distribution of 6 μm to 40 μm, more preferably of 8 μm to 35 μm, and still more preferably of 10 μm to 30 μm.

When $D_{50}$ of the mass of the graphite particle spherical aggregates is within the above ranges, good initial charge/discharge efficiency and high speed chargeability can be easily exerted when used as an electrode material.

Furthermore, in the negative electrode material for a lithium-ion secondary battery of the present invention, the mass of the graphite particle spherical aggregates preferably has a 90% cumulative particle size ($D_{90}$) in volume-based cumulative particle size distribution of 14 μm to 50 μm, more preferably of 16 μm to 45 μm, and still more preferably of 18 μm to 40 μm.

When $D_{90}$ of the mass of the graphite particle spherical aggregates is within the above ranges, the diffusion path of the electrolytic solution is shortened and excellent high speed chargeability can be easily exerted when used as an electrode material.

Furthermore, in the negative electrode material for a lithium-ion secondary battery of the present invention, the mass of the graphite particle spherical aggregates has a ratio ($D_{90}/D_{10}$) of 90% cumulative particle size ($D_{90}$) in volume-based cumulative particle size distribution to 10% cumulative particle size ($D_{10}$) in volume-based cumulative particle size distribution of 2.0 to 3.5, preferably of 2.0 to 3.0, and more preferably of 2.0 to 2.7.

When $D_{90}/D_{10}$ in the mass of the graphite particle spherical aggregates is within the above ranges, aggregation in slurry for electrode coating is reduced, the binding property between the binder and the current collector is improved, and the cycle characteristics are improved.

Further, in the negative electrode material for a lithium-ion secondary battery of the present invention, the particle size distribution index (SPAN) of the mass of the graphite particle spherical aggregates means a value calculated by the following formula.

$$SPAN=(D_{90}-D_{10})/D_{50}$$

Here, $D_{90}$ means a 90% cumulative particle size in volume-based cumulative particle size distribution, $D_{50}$ means a 50% cumulative particle size in volume-based cumulative particle size distribution, and $D_{10}$ means a 10% cumulative particle size in volume-based cumulative particle size distribution.

The particle size distribution index (SPAN) is preferably 0.5 to 1.4, more preferably 0.5 to 1.2, and still more preferably 0.5 to 1.0.

When the SPAN in the mass of the graphite particle spherical aggregates is within the above ranges, aggregation in slurry for electrode coating can be effectively reduced, and the binding property between the binder and the current collector can be easily improved, and the cycle characteristics can be easily improved when used as an electrode material.

In the present application, in the volume-based cumulative particle size distribution in a mass of graphite particle spherical aggregates, the 10% cumulative particle size ($D_{10}$), the 50% cumulative particle size ($D_{50}$), and the 90% cumulative particle size ($D_{90}$) mean values calculated using a laser diffraction particle size distribution analyzer.

Specifically, they mean the 10% cumulative particle size ($D_{10}$) in volume-based cumulative particle size distribution, the 50% cumulative particle size ($D_{50}$) in volume-based cumulative particle size distribution, and the 90% cumulative particle size ($D_{90}$) in volume-based cumulative particle size distribution, which are determined when the volume-based cumulative particle size distribution is measured using a laser diffraction particle size distribution analyzer (SALD-2100 manufactured by Shimadzu Corporation) in a state where about ≤2θ≤mg of graphite particle spherical aggregate powder is ultrasonically dispersed in pure water containing a surfactant.

In the negative electrode material for a lithium-ion secondary battery of the present invention, when $D_{90}/D_{10}$ and the particle size distribution index (SPAN) in the mass of the graphite particle spherical aggregates are within the above ranges, the particle size distribution is excellent, and it is possible to maintain the electrolytic solution flow path and to maintain the high speed chargeability at high electrode plate density when pressed to form an electrode while being deformed such that the graphite particle spherical aggregates reach a certain density or more.

In the negative electrode material for a lithium-ion secondary battery of the present invention, the crystallite size Lc (004) in the c-axis direction of graphite constituting the graphite particle spherical aggregate is 40 nm to 100 nm, preferably 40 nm to 90 nm, and more preferably 40 nm to 80 nm.

When the crystallite size Lc (004) in the c-axis direction of the graphite constituting the graphite particle spherical aggregates is within the above ranges, it is possible to easily exert a sufficient strength capable of exerting a certain resistance to the applied pressure to maintain the electrolytic solution flow path and maintain the non-parallel orientation of the flat graphite constituting the graphite particle spherical aggregates when pressed to form an electrode while being deformed such that the graphite particle spherical aggregates reach a certain density or more.

In the negative electrode material for a lithium-ion secondary battery of the present invention, the interlayer distance $d_{002}$ of the graphite constituting the graphite particle spherical aggregate is preferably 0.3350 nm to 0.3380 nm, more preferably 0.3355 nm to 0.3370 nm, and still more preferably 0.3355 nm to 0.3365 nm.

When the interlayer distance $d_{002}$ of the graphite constituting the graphite particle spherical aggregates is within the above ranges, it is possible to easily exert a sufficient strength capable of exerting a certain resistance to the applied pressure to maintain the electrolytic solution flow path and maintain the non-parallel orientation of the flat graphite constituting the graphite particle spherical aggregates when pressed to form an electrode while being deformed such that the graphite particle spherical aggregates reach a certain density or more.

In the present application, the crystallite size Lc (004) in the c-axis direction of graphite constituting the graphite particle spherical aggregates means a value calculated by Gakushin method using an X-ray diffractometer, and in the present application, the interlayer distance ($1_{002}$ of graphite constituting the graphite particle spherical aggregates also means a value calculated by Gakushin method using an X-ray diffractometer.

Specifically, the interlayer distance $d_{002}$ and the crystallite size Lc (004) in the c-axis direction of graphite means values determined according to the Gakushin method established by the 117th Committee of the Japan Society for the Promotion of Sciences based on the intensity and half width of the obtained diffraction peak from the carbon (004) plane measured by performing a powder X-ray diffraction method on high-purity silicon as a standard substance using an X-ray diffractometer (Ultima IV manufactured by Rigaku Corporation) with X-rays obtained by monochromating Cu-Kα rays with a Ni filter.

In the negative electrode material for a lithium-ion secondary battery of the present invention, the mass of the graphite particle spherical aggregates has a proportion of the graphite particle spherical aggregates in which the largest flat graphite particle observed on their outermost surface has a circle equivalent diameter of 2 μm to 12 μm within the graphite particle spherical aggregates having a circle equivalent diameter of 10 μm or more when observed by a scanning electron microscope (SEM) of 80% or more, more preferably 85% or more, and still more preferably 90% or more in terms of number.

As described above, the negative electrode material for a lithium-ion secondary battery of the present invention is defined by the proportion of the graphite particle spherical aggregates in which the largest flat graphite particle observed on the outermost surface has a circle equivalent diameter of 2 μm to 12 μm in the graphite particle spherical aggregates having the above circle equivalent diameter of 10 μm or more, but may also alternatively be defined by the proportion of the graphite particle spherical aggregates in which the largest flat graphite particle observed on the outermost surface has a circle equivalent diameter of 4 μm to 12 μm in the graphite particle spherical aggregates having the above circle equivalent diameter of 10 μm or more. In this case, the proportion of the graphite particle spherical aggregates in which the largest flat graphite particle observed on the outermost surface has a circle equivalent diameter of 4 μm to 12 μm in graphite particle spherical aggregates having the above circle equivalent diameter of 10 μm or more is preferably 80% or more, more preferably 85% or more, and still more preferably 90% or more in terms of number.

When the circle equivalent diameter of the largest flat graphite particle observed on the outermost surface of a graphite particle spherical aggregate is within the above ranges, the electrolytic solution flow path inside is widened when used as a negative electrode material and the discharge capacity can be easily maintained even at high speed charging. Further, the increase in contact points makes it difficult for the current flow path to be interrupted due to expansion and contraction during charging and discharging, thereby improving the cycle characteristics.

In the present application, the proportion of the graphite particle spherical aggregates in which the largest flat graphite particle observed on the outermost surface by a scanning electron microscope has a circle equivalent diameter of 2 μm to 12 μm in graphite particle spherical aggregates having a circle equivalent diameter of 10 μm or more (small particle abundance proportion (%)) is calculated by the following procedure.

Further, in the present application, the proportion of the graphite particle spherical aggregates in which the largest flat graphite particle observed on the outermost surface by a scanning electron microscope has a circle equivalent diameter of 4 μm to 12 μm in graphite particle spherical aggregates having a circle equivalent diameter of 10 μm or more (small particle abundance proportion (%)) can also be calculated by the same method as the procedure described below using the number of graphite particle spherical aggregates in which the largest flat graphite particle observed on the outermost surface has a circle equivalent diameter of 4 μm to 12 μm instead of the number of graphite particle spherical aggregates in which the largest flat graphite particle observed on their outermost surface has a circle equivalent diameter of 2 μm to 12 μm.

Graphite particle spherical aggregate powder fixed on the sample stand is observed using a scanning electron microscope (JSM-6340F manufactured by JEOL Ltd.) at an acceleration voltage of 10 kV, an observation magnification of 1000 times, a working distance (WD) of 25 mm, and a lower secondary electron detector for the detection of secondary electrons. The obtained SEM image is read by image analysis software (WinROOF manufactured by MITANI SHOJI Co., Ltd.), and using an arbitrary shape selection tool, the region in the outer peripheral portion of the graphite particle spherical aggregate is selected (as shown by the line enclosing the outer periphery of the graphite particle spherical aggregate shown in the center portion of the right side image of FIG. 2) to determine the particle area. Next, the diameter of a circle having the same area as the selected region (particle area) is determined as the circle equivalent diameter.

Further, 500 particles of graphite particle spherical aggregates having a circle equivalent diameter of 10 μm or more are arbitrarily selected. Next, the region in the outer peripheral portion of the largest particle among flat graphite particles that can be observed on the outermost surface of each graphite particle spherical aggregate is selected using an arbitrary shape selection tool (as shown by the line enclosing the outer periphery of a flat graphite particle constituting the graphite particle spherical aggregate shown in the center portion of the right side image of FIG. 2).

Thereafter, the diameter of a circle having the same area as the selected region (particle area) is determined as the circle equivalent diameter, and the small particle abundance proportion (arithmetic mean value in terms of number: %) is calculated by the following formula.

Small particle abundance proportion (%)=the number of the graphite particle spherical aggregates in which the largest flat graphite particle observed on the outermost surface has a circle equivalent diameter of 2 μm to 12 μm/500 (total number of graphite particle spherical aggregates having a circle equivalent diameter of 10 μm or more)

When the small particle abundance proportion is 80% or more, the abundance proportion of the graphite particle spherical aggregates having a desired unevenness on the surface becomes high, and thus it is easy to form a desired electrolytic solution flow path when pressed during electrode formation while being deformed such that the graphite particle spherical aggregates reach a certain density or more. Therefore, it is possible to easily provide a negative electrode material for a lithium-ion secondary battery capable of increasing the electrode density and improving the discharge capacity and also excellent in high speed charging characteristics by exerting high electrolytic solution permeability.

Here, the largest flat graphite particle observed on the outermost surface in graphite particle spherical aggregates having a circle equivalent diameter of 10 μm or more are those having a strength to maintain the aggregated state without being peeled off before and after measurement when subjected to measurement by a scanning electron microscope observation (SEM).

In the negative electrode material for a lithium-ion secondary battery of the present invention, the number-based proportion of the graphite particle spherical aggregates having a circle equivalent diameter of 10 μm or more when observed by a scanning electron microscope contained in a mass of graphite particle spherical aggregates is preferably 50 to 100%, more preferably 55 to 95%, and still more preferably 60 to 90%.

In the negative electrode material for a lithium-ion secondary battery of the present invention, when the number-based proportion of the graphite particle spherical aggregates having a circle equivalent diameter of 10 μm or more when observed by a scanning electron microscope contained in a mass of graphite particle spherical aggregates within the above ranges, good initial charging efficiency and high speed charging characteristics can be easily exerted when used as an electrode material.

In the present application, the number-based proportion of the graphite particle spherical aggregate having a circle equivalent diameter of 10 μm or more contained in a mass of graphite particle spherical aggregates means, when the circle equivalent diameters of 1000 graphite particle spherical aggregates are each obtained by a scanning electron microscope by the same method as described above, the proportion of the number of graphite particle spherical aggregates having a circle equivalent diameter of 10 μm or more to the total number of graphite particle spherical aggregates to be measured (1000) calculated by the following formula.

Number-based proportion (%) of graphite particle spherical aggregates having a circle equivalent diameter of 10 μm or more=(number of graphite particle spherical aggregates having a circle equivalent diameter of 10 μm or more/1000)×100

In the negative electrode material for a lithium-ion secondary battery of the present invention, the specific surface area (SA) of the mass of the graphite particle spherical aggregates is preferably 0.8 to 5 $m^2/g$, more preferably 0.8 to 4 $m^2/g$, and still more preferably 0.8 to 3 $m^2/g$.

When the specific surface area (SA) of the mass of the graphite particle spherical aggregates is within the above ranges, the edge portions of the flat graphite particles constituting the aggregates are reduced, and when used as an electrode material, the charge/discharge irreversible capacity at the initial cycle is easily reduced, the charge/discharge efficiency is easily improved, and the electrode density is easily increased as the aggregate approaches to a sphere in shape.

Here, in the present application, the specific surface area (SA) of the mass of the graphite particle spherical aggregates means a value calculated by the multipoint BET method in the range of the relative pressure 0.05 to 0.2 in the nitrogen adsorption isotherm using a fully automatic surface area analyzer (Gemini V manufactured by Shimadzu Corporation).

In the negative electrode material for a lithium-ion secondary battery of the present invention, the mass of the graphite particle spherical aggregates preferably has a tapped density of 0.8 to 1.3 g/cm$^3$, more preferably 0.9 to 1.3 g/cm$^3$, and still more preferably 1.0 to 1.3 g/cm$^3$.

When the tapped density of the mass of the graphite particle spherical aggregates is within the above ranges, the electrode density can be easily improved during the formation of the electrode material, and due to the high density of aggregates, the orientation planes can be maintained non-parallel when pressed to form an electrode, the cycle characteristics can be easily improved, and the graphitization cost and transportation cost can be easily reduced.

Here, in the present application, the tapped density of the mass of the graphite particle spherical aggregates means a value calculated by the following formula from the value of the apparent volume after putting 5 g of graphite particle powder into a 25 ml graduated cylinder and repeating tapping 1000 times with a gap of 10 mm using a tapping powder reduction degree measuring instrument manufactured by TSUTSUI SCIENTIFIC INSTRUMENTS CO., LTD. and the mass of the graphite particle powder put into the graduated cylinder.

Tapped density (g/cm$^3$)=mass of powder put into graduated cylinder (g)/value of apparent volume after repeating tapping 1000 times (cm$^3$).

In the negative electrode material for a lithium-ion secondary battery of the present invention, the final electrode plate density of the mass of the graphite particle spherical aggregates is preferably 1.40 to 1.85 g/cm$^3$, more preferably 1.50 to 1.80 g/cm$^3$, and still more preferably 1.55 to 1.75 g/cm$^3$.

When the final electrode plate density of the mass of the graphite particle spherical aggregates is within the above ranges, both the energy density and the high speed charge-ability of the battery can be easily achieved.

In the present application, when the final electrode plate density of the graphite particle spherical aggregate is within the above ranges, the charge amount per unit volume (battery capacity) can be easily controlled within a desired range.

In the negative electrode material for a lithium-ion secondary battery of the present invention, the electrode plate orientation ratio (electrode plate orientation ratio after pressing) of the mass of the graphite particle spherical aggregates is preferably 0.05 or more, more preferably 0.08 or more, and still more preferably 0.10 or more.

The electrode plate orientation ratio is defined as the peak intensity 1(110) derived from the carbon (110) plane to the peak intensity 1(110) derived from the carbon (004) plane (peak intensity ratio 1(110)/1(004)) obtained by measuring an electrode sheet after pressing with an X-ray diffractometer.

When the electrode plate orientation ratio of the mass of the graphite particle spherical aggregates is within the above ranges, it is possible to maintain the orientation planes of the plurality of flat graphite particles non-parallel to a desired degree. Therefore, the cycle characteristics of the battery (battery lifetime) can be easily improved when used as a negative electrode material for a lithium-ion secondary battery.

Here, in the present application, the final electrode plate density and the electrode plate orientation ratio of the graphite particle spherical aggregates mean values measured by the following methods.

(1) Production of Electrode Sheet

An organic binder polyvinylidene fluoride (PVDF) dissolved in N-methyl-2pyrrolidone in an amount of 10 weight % in solid content is added to graphite particle spherical aggregates in an amount of 90 weight %, and the mixture is stirred and mixed to prepare a negative electrode mixture paste.

The obtained negative electrode mixture paste is applied onto a copper foil (current collector) having a thickness of 18 μm with a doctor blade method, and then heated to 130° C. in vacuum to completely volatilize the solvent, thereby obtaining an electrode sheet having a basis weight of 15.0±0.4 mg/cm$^2$.

Here, the basis weight means the weight of the graphite particle spherical aggregate per unit area of the electrode sheet.

(2) Measurement of Final Electrode Plate Density

The electrode sheet is cut into strips having a width of 5 cm and rolled by a roller press at a linear pressure of 3000 kg/5 cm. The pressed electrode sheet is punched into 5 coin-shaped parts having a diameter of 1.62 cm, and the arithmetic mean value of the electrode plate densities calculated from each of the weights A (g) and the thicknesses B (cm) of the center portions of punched coin-shaped parts by the following formula is taken as the final electrode plate density.

Electrode plate density (g/cm$^3$)={(A (g)−copper foil weight (g))×weight proportion of the graphite particle spherical aggregates in negative electrode mixture layer (0.9)}/{(B (cm)−copper foil thickness (cm))×punching area (cm$^2$)}

(3) Measurement of Electrode Plate Orientation Ratio

The electrode sheet pressed in (2) is fixed on a glass plate with double-sided tape, and the wide-angle X-ray diffraction curve is measured using CuKα rays monochromated with a graphite monochromator using an X-ray diffractometer (Ultima IV manufactured by Rigaku Corporation). The slits and measurement conditions are as follows. Here, 2θ represents the diffraction angle.

Slit: Divergence slit=2/3 degrees, Light receiving slit=0.15 mm, Scattering slit=2/3 degrees Measuring range and step angle/measuring time:
- (110) plane: 76.0 degrees ≤2θ≤79.0 degrees 0.01 degrees/3 seconds
- (004) plane: 53.0 degrees ≤2θ≤56.0 degrees 0.01 degrees/3 seconds The obtained chart is subjected to fitting by using a split pseudo-Voigt function as a profile function to separate the peaks, and the integrated intensities of the peaks from the (110) plane and the (004) plane are calculated. Next, the ratio of the diffraction intensity from the (110) plane to the diffraction intensity from the (004) plane (electrode plate orientation ratio I(110)/I(004)) was determined. The measurement was repeated 5 times, and the arithmetic mean value of the diffraction intensity ratios (electrode plate orientation ratio I(110)/I(004)) was taken as the electrode plate density.

The graphite particle spherical aggregate constituting the negative electrode material for a lithium-ion secondary battery of the present invention is preferably (i) a graphitized product of a granulated product of a green needle coke or calcined needle coke and an organic binder in the absence of a graphitization catalyst, or (ii) a graphitized product of a granulated carbonized product obtained by carbonizing a granulated product of a green needle coke or calcined needle coke and an organic binder in the absence of a graphitization catalyst.

The details of the method of granulating a green needle coke or calcined needle coke and an organic binder, the method of carbonizing the obtained granulated product, and the method of graphitizing in the absence of a graphitization catalyst are described in the description of the negative electrode material for a lithium-ion secondary battery of the present invention below.

The negative electrode material for a lithium-ion secondary battery of the present invention can be suitably produced by the method for producing a negative electrode material for a lithium-ion secondary battery according to the present invention described below.

According to the present invention, the negative electrode material for a lithium-ion secondary battery comprises a mass comprising, with a narrow particle size distribution, graphite particle spherical aggregates having a high circularity formed by aggregating a plurality of flat graphite particles having a specific crystallite size and in which flat graphite particles having a certain circle equivalent diameter are observed on the outermost surface when observed by a scanning electron microscope. Therefore, when pressed to form an electrode, pressure can be suitably applied to easily increase the density, and it is possible to exert an excellent strength capable of exerting a certain resistance to maintain non-parallel orientation of the flat graphite, as well as to easily form gaps suitable as electrolytic solution flow path between the graphite particle spherical aggregates.

Therefore, according to the present invention, it is possible to provide a negative electrode material for a lithium-ion secondary battery with excellent electrolytic solution permeability, which is capable of improving the discharge capacity by increasing the electrode density and improving the cycle characteristics (lifetime characteristics) by achieving high orientation of the electrode plate.

Next, a method for producing a negative electrode material for a lithium-ion secondary battery of the present invention will be described.

The method for producing a negative electrode material for a lithium-ion secondary battery of the present invention is a method for producing a negative electrode material for a lithium-ion secondary battery comprising a mass of graphite particle spherical aggregates in which a plurality of flat graphite particles are aggregated in a spherical shape, the method comprising:

(a) a step of mixing a green needle coke or calcined needle coke and an organic binder to obtain a granulated product; and (b) a step of graphitizing in the absence of a graphitization catalyst, the granulated product or a granulated carbonized product obtained by carbonizing the granulated product to obtain a graphitized product.

In the method for producing a negative electrode material for a lithium-ion secondary battery of the present invention, the green needle coke or calcined needle coke means coke having a developed needle-like structure, and may cause puffing during high temperature firing such as graphitization.

Green needle coke is usually obtained by coking raw material oils such as coal tar pitch, petroleum-based heavy oil, liquefied coal, and naphtha cracked residue oil. Green needle coke is industrially usually obtained by coking the raw material oils at a heating temperature of 400 to 600° C. and a pressure of atmospheric pressure to 10 kg/cm$^2$ for about 12 to 48 hours by a delayed coking method, with about 10% of atoms other than carbon atoms such as hydrogen atoms, oxygen atoms, and nitrogen atoms remaining therein.

Calcined needle coke is obtained by calcining the green needle coke at a temperature of about 1000 to 1500° C., and vaporizing atoms other than carbon atoms such as hydrogen atoms, oxygen atoms, and nitrogen atoms remaining in the calcined needle coke to about several percent to form fine pores.

The green needle coke and the calcined needle coke may be used alone or in any combination of two or more kinds at any proportion.

In the method for producing a negative electrode material for a lithium-ion secondary battery of the present invention, the organic binder may be one or more selected from various polymer compounds such as thermosetting resins and thermoplastic resins, and rubber, tar, and pitch.

More specifically, one or more selected from polyethylene, polypropylene, polyvinylidene fluoride, polytetrafluoroethylene, polyethylene oxide, polyepichlorohydrin, polyphosphazene, polyimide resin, polyamideimide resin, polyamide resin, polyacrylic acid, sodium polyacrylate, acrylic resin, polyacrylonitrile, phenol resin, styrene-butadiene rubber, butyl rubber, natural rubber, coal tar, petroleum-based pitch, coal-based pitch, creosote oil, ethylene bottom oil, and the like can be used as the organic binder.

The organic binders may be used alone or in combination of two or more at any proportion.

Further, in the method for producing a negative electrode material for a lithium-ion secondary battery of the present invention, a green needle coke or calcined needle coke and an organic binder may be mixed in the presence of an organic solvent.

Specific examples of the organic solvent include one or more selected from amide organic solvents such as N-methyl-2-pyrrolidone (NMP), N-ethyl-2-pyrrolidone (NEP), N,N-dimethylformamide, N,N-dimethylacetamide, N,N-diethylacetamide, and N-methylcaprolactam, low molecular weight polyols such as ethylene glycol, 1,2-propanediol, 1,3-propanediol, 2-methyl-1,3-propanediol, 2-butyl-2-ethyl-1,3-propanediol, 1,4-butanediol, and neopentyl glycol, ethylene oxide adducts such as diethylene glycol, triethylene glycol, tetraethylene glycol, and polyethylene glycol, propylene oxide adduct such as dipropylene glycol, ethylene oxide and/or propylene oxide adducts of the above low molecular weight polyols, polyether polyols such as polytetramethylene glycol, 1,3-dimethyl-2-imidazolidinone, hexamethylphosphorotriamide, 1,2-dimethoxy ethane, bis(2-methoxyethyl)ether, 1,2-bis(2-methoxyethoxy)ethane, tetrahydrofuran, bis[2-(2-methoxyethoxy) ethyl] ether, 1,4-dioxane, dimethyl sulfoxide, diphenyl ether, sulfolane, diphenyl sulfone, tetramethyl urea, anisole, γ-butyrolactone, and isopropanol.

The organic solvents may be used alone or in combination of two or more at any proportion.

In the method for producing a negative electrode material for a lithium-ion secondary battery of the present invention, in step (a), a green needle coke or calcined needle coke and an organic binder are mixed in the presence of an organic solvent as necessary to obtain a granulated product. The order of mixing the green needle coke or calcined needle coke and the organic binder may be appropriately selected.

In this case, the actual carbon ratio of the organic binder or the mixture of the organic binder and the organic solvent when fired at 1000° C. is preferably 5 to 60 mass %, more preferably 10 to 55 mass %, and still more preferably 15 to 50 mass %.

When the actual carbon ratio of the organic binder or the mixture of the organic binder and the organic solvent is within the above ranges, the flat graphite particles can be easily granulated to the intended particle size. Further, this allows the particles after firing and graphitization to have appropriate strength, so that the electrolytic solution flow path can be maintained and the non-parallel orientation of the graphite can also be maintained when pressed to form an electrode while being deformed such that the graphite particles reach a certain density or more.

In the present application, the actual carbon ratio means a value measured by the following method.

(Measurement Method of Actual Carbon Ratio)

Approximately ≤2θ≤g of a binder is placed in a boat-type graphite crucible and set in a horizontal tubular furnace. While flowing argon gas at 0.8 L/min, the temperature is raised to 1000° C. in 10 hours, the temperature is kept at 1000° C. for 2 hours for carbonization, and then cooled to room temperature. At this time, as shown in the following formula, the value obtained by dividing the mass of the carbonized material after cooling by the mass of the organic binder or the mixture of the organic binder and the organic solvent before heating and multiplying by 100 is taken as the actual carbon ratio.

Actual carbon ratio (mass %)={mass (g) of carbonized material after cooling/mass (g) of organic binder or mixture of organic binder and organic solvent before heating}×100

When the amount of needle coke used (the amount of green needle coke and/or calcined needle coke used) is 100 parts by mass, the blending proportion of the organic binder or the mixture of the organic binder and the organic solvent is 5 to 50 parts by mass, more preferably 10 to 45 parts by mass, and still more preferably 15 to 40 parts by mass.

When the blending proportion of the organic binder or the mixture of the organic binder and the organic solvent to the amount of needle coke used (the amount of green needle coke and/or calcined needle coke used) is within the above ranges, the flat graphite particles can be easily granulated to the intended particle size, and when used as an electrode material, the capacity characteristics of the battery are easily improved, and the non-parallel orientation of graphite constituting the granulated product is easily maintained.

The method of mixing and granulating the green needle coke or calcined needle coke with an organic binder, and the method of mixing and granulating the green needle coke or calcined needle coke with an organic binder and an organic solvent are not particularly limited, and for example, various stirrers or mixers, such as kneaders, may be used to mix and stir the mixture while appropriately adding an organic solvent and appropriately setting the viscosity and stirring speed of the mixture so that a granulated product having a desired particle size can be obtained.

The stirring is preferably carried out at a temperature equal to or higher than the softening point of the organic binder, preferably at a temperature of 50 to 300° C. when the organic binder is pitch, tar, or the like, and preferably at a temperature of ≤2θ≤to 100° C. when the organic binder is a thermosetting resin.

In the method for producing a negative electrode material for a lithium-ion secondary battery of the present invention, a drying treatment may be further performed after the mixing and granulation treatment.

The treatment temperature during the drying treatment is preferably 50 to 500° C., more preferably 80 to 300° C., and still more preferably 100 to 150° C.

By performing the drying treatment after the mixing and granulation treatment, the handleability of the obtained granulated product can be easily improved.

In the method for producing a negative electrode material for a lithium-ion secondary battery of the present invention, in step (b), the granulated product obtained in step (a) is graphitized in the absence of a graphitization catalyst, or a granulated carbonized product obtained by carbonizing the granulated product obtained in step (a) is graphitized to obtain a graphitized product.

The conditions for carbonizing the granulated product obtained in step (a) to obtain the granulated carbonized product are not particularly limited.

The heating temperature during carbonization is preferably 500 to 1500° C., more preferably 600 to 1300° C., and still more preferably 700 to 1100° C.

The carbonization treatment time (treatment time at the heating temperature) is preferably 0.1 to 100 hours, more preferably 0.3 to 10 hours, and still more preferably 0.5 to 5 hours.

The carbonization treatment may be performed multiple times.

The temperature raising time and the temperature lowering time may be appropriately selected.

The heating atmosphere during the carbonization treatment is preferably an inert atmosphere. In the present application, the inert atmosphere means an atmosphere in which an oxidizing active gas such as oxygen does not exist, and examples thereof include an argon atmosphere and a nitrogen atmosphere.

In the method for producing a negative electrode material for a lithium-ion secondary battery of the present invention, the granulated carbonized product obtained by carbonizing the mixed and granulated product of the green needle coke or calcined needle coke and the organic binder may be appropriately pulverized.

The method of the pulverization treatment is not particularly limited, and for example, one or more methods selected from known methods such as a jet mill, a vibration mill, a pin mill, and a hammer mill may be appropriately selected.

In the method for producing a negative electrode material for a lithium-ion secondary battery of the present invention, the granulated carbonized product is calcined in the absence of a graphitization catalyst to obtain a graphite particle spherical aggregate which is the graphitized product.

The treatment temperature (graphitization temperature) when the granulated product or granulated carbonized product is graphitized is preferably 2000° C. to 3000° C., more preferably 2500° C. to 3000° C., and still more preferably 2700 to 3000° C.

When the graphitization temperature is within the above range, carbon crystallization (graphitization) can be suitably promoted.

In the method for producing a negative electrode material for a lithium-ion secondary battery of the present invention, the graphitization treatment time may be appropriately selected.

In the method for producing a negative electrode material for a lithium-ion secondary battery of the present invention, graphitization treatment is performed in the absence of a graphitization catalyst to obtain the graphitized product.

As a result of studies by the present inventors, it has been found that the graphitized product obtained in the presence of a graphitization catalyst is less likely to show resistance to the applied pressure when pressed to form an electrode, and the graphite particle spherical aggregates can reach a certain density or more, but the particle aggregates are easily crushed, the non-parallel orientation of the flat graphite constituting the particle aggregates cannot be maintained, and the improvement of the cycle characteristics (lifetime characteristics) by the improvement of the electrode plate orientation ratio cannot be achieved.

On the other hand, as a result of studies by the present inventors, it has been found that the graphitized product obtained in the absence of a graphitization catalyst has a sufficient strength capable of exerting a certain resistance to the applied pressure to maintain the non-parallel orientation of the flat graphite constituting the graphite particle spherical aggregate when pressed, thereby completing the present invention.

In the method for producing a negative electrode material for a lithium-ion secondary battery of the present invention, when a graphitized product having a desired particle size distribution has been obtained in step (b), the graphitized product may be used as a mass of intended graphite particle spherical aggregates as it is, or may be appropriately subjected to a pulverization treatment and a classification treatment so that the obtained graphitized product has a desired particle size distribution.

The method of the pulverization treatment is not particularly limited, and for example, one or more methods selected from known methods such as a jet mill, a vibration mill, a pin mill, and a hammer mill may be appropriately selected.

Through the treatment, the intended graphite particle spherical aggregate can be obtained.

The details of the obtained mass of graphite particle spherical aggregates are as described in the description of the negative electrode material for a lithium-ion secondary battery of the present invention.

According to the present invention, it is possible to easily exert a sufficient strength capable of exerting a certain resistance to the applied pressure to maintain the electrolytic solution flow path and maintain the non-parallel orientation of the flat graphite constituting the graphite particle spherical aggregates when pressed to form an electrode while being deformed such that the mass of the graphite particle spherical aggregates reach a certain density or more as well as to easily form gaps suitable as electrolyte flow path between the graphite particle spherical aggregates.

Therefore, according to the present invention, it is possible to provide a simple method for producing a negative electrode material for a lithium-ion secondary battery with excellent electrolytic solution permeability, which is capable of improving the discharge capacity by increasing the electrode density and improving the cycle characteristics (lifetime characteristics) by achieving high orientation of the electrode plate.

EXAMPLES

Next, the present invention will be described in more detail with reference to examples, but the present invention is not limited to these examples.

(Example 1)

(Preparation of Raw Material)

Coal-based needle coke A (ash content 0.03 mass %, volatile content 4.37 mass %) was finely pulverized by a high-speed rotor type pulverizer to obtain coke fine particles having an average particle size of 9.4 μm.

(Preparation of Binder)

100 parts by weight of a phenol resin (viscosity 5300 cp, gelation time 351 seconds, nonvolatile content 57 mass %) and 100 parts by weight of diethylene glycol (manufactured by Kishida Chemical Co., Ltd.) were mixed and stirred at room temperature to obtain a binder.

(Production of Graphite Particles)

100 parts by weight of the coke fine particles and 30 parts by weight of the binder were kept at 40° C. and granulated using a Henschel mixer.

Next, the obtained granulated product was heat-treated at 1000° C. in a non-oxidizing atmosphere for carbonization, then coarsely pulverized and classified with a sieve having an opening of 53 μm to remove coarse powder, and then heat-treated at 3000° C. or higher in an Acheson furnace to obtain the intended graphite particle spherical aggregate powder (the mass of graphite particle spherical aggregate).

FIG. 2 shows a scanning electron microscope (SEM) image of the obtained graphite particle spherical aggregates. The SEM images shown on the left side and the right side of FIG. 2 are the same, but the SEM image shown on the right side of FIG. 2 is a figure for showing a method for specifying the morphology of the graphite particle spherical aggregate by SEM observation described later.

Regarding the obtained graphite particle spherical aggregate powder (the mass of graphite particle spherical aggregates), the particle size distribution, specific surface area (SA), tapped density, average circularity, interlayer distance $d_{002}$ and crystallite size Lc (004) in the c-axis direction of graphite constituting the graphite particle spherical aggregates, specification of morphology of graphite particle spherical aggregates by scanning electron microscope (SEM) observation (specification of abundance proportion of small particles), electrode plate orientation ratio before pressing, electrode plate orientation ratio, and final electrode plate density were measured by the following methods.

The results are shown in Tables 1 and 2.

It should be noted that the number-based proportion of the graphite particle spherical aggregates having a circle equivalent diameter of 10 μm or more contained in the graphite particle spherical aggregate powder (the mass of graphite particle spherical aggregates) specified by scanning electron microscope (SEM) observation was 79%, and the number-based proportions of the graphite particle spherical aggregates specified by the specification of the morphology of the graphite particle spherical aggregates by scanning electron microscope (SEM) observation (specification of abundance proportion of small particles) were as follows.

Graphite particle spherical aggregates in which the largest flat graphite particle that can be observed on the outermost surface has a circle equivalent diameter of less than 2 μm: 4%

Graphite particle spherical aggregates in which the largest flat graphite particle that can be observed on the outermost surface has a circle equivalent diameter of less than 4 μm: 5%

Graphite particle spherical aggregates in which the largest flat graphite particle that can be observed on the outermost surface has a circle equivalent diameter of 2 μm to 12 μm: 96%

Graphite particle spherical aggregates in which the largest flat graphite particle that can be observed on the outermost surface has a circle equivalent diameter of 4 µm to 12 µm: 92%

Graphite particle spherical aggregates in which the largest flat graphite particle that can be observed on the outermost surface has a circle equivalent diameter of more than 12 µm: 0%

Graphite particle spherical aggregates in which the presence of flat graphite particle on the outermost surface cannot be confirmed: 4%

(Measurement of Pparticle Size Distribution)

About 20 mg of the obtained graphite particle spherical aggregate powder was ultrasonically dispersed in pure water containing a surfactant, and the volume-based cumulative particle size distribution was measured using a laser diffraction particle size distribution analyzer (SALD-2100 manufactured by Shimadzu Corporation).

The 10% cumulative particle size ($D_{10}$) in volume-based cumulative particle size distribution, the 50% cumulative particle size ($D_{50}$) in volume-based cumulative particle size distribution, and the 90% cumulative particle size ($D_{90}$) in volume-based cumulative particle size distribution were determined, and the ratio ($D_{90}/D_{10}$) of 90% cumulative particle size in volume-based cumulative particle size distribution to 10% cumulative particle size in volume-based cumulative particle size distribution was calculated.

(Measurement of Specific Surface Area (SA))

The specific surface area of the graphite particle spherical aggregate powder was calculated by the multipoint BET method in the range of the relative pressure 0.05 to 0.2 in the nitrogen adsorption isotherm using a fully automatic surface area analyzer (Gemini V manufactured by Shimadzu Corporation).

(Measurement of Tapped Density)

The tapped density of the graphite particle spherical aggregate powder was calculated by the following formula from the value of the apparent volume after putting 5 g of the graphite particle powder into a 25 ml graduated cylinder and repeating tapping 1000 times with a gap of 10 mm using a tapping powder reduction degree measuring instrument manufactured by TSUTSUI SCIENTIFIC INSTRUMENTS CO., LTD. and the mass of the graphite particle powder put into the graduated cylinder.

Tapped density ($g/cm^3$)=mass of powder put into graduated cylinder (g)/value of apparent volume after repeating tapping 1000 times ($cm^3$)

(Measurement of Average Circularity)

Regarding the circularity of the obtained graphite particle spherical aggregate powder, about 20 mg of the graphite particle spherical aggregate powder was ultrasonically dispersed in pure water containing a surfactant and the circle equivalent diameter thereof when the projected area of each graphite particle spherical aggregate is converted into a circle was calculated by performing measurement in LPF measurement mode using a standard imaging unit of a flow-type particle image analyzer (FPIA-3000, manufacture by Spectris Co., Ltd).

For each of 10,000 to 50,000 graphite aggregates having a circle equivalent diameter of 8 µm to 160 µm obtained, the "perimeter of circle having area equal to projected area of aggregate/perimeter of projected image of graphite particle spherical aggregate" was calculated according to Wadell's equation, and the arithmetic mean value thereof was taken as the average circularity.

(Measurement of Interlayer Distance $d_{002}$ and Crystallite Size Lc (004))

The interlayer distance $d_{002}$ and the crystallite size Lc (004) in the c-axis direction of the graphite constituting the graphite particle spherical aggregate were determined according to the Gakushin method established by the 117th Committee of the Japan Society for the Promotion of Sciences based on the intensity and half width of the obtained diffraction peak from the carbon (004) plane measured by performing a powder X-ray diffraction method on high-purity silicon as a standard substance using an X-ray diffractometer (Ultima IV manufactured by Rigaku Corporation) with X-rays obtained by monochromating Cu-Kα rays with a Ni filter.

(Specification of Morphology of Graphite Particle Spherical Aggregates by Scanning Electron Microscope (SEM) Observation)

Morphological observation of the graphite particle spherical aggregate by a scanning electron microscope (SEM) was carried out by the following procedure.

A carbon tape cut out in a size of about 3 mm square was attached on an SEM sample stand, and the graphite particle spherical aggregate powder was gently scattered thereon. The excess powder was removed using air, and only the powder remaining on the carbon tape was observed.

The observation was performed using a scanning electron microscope (JSM-6340F) manufactured by JEOL Ltd., at an accelerating voltage of 10 kV, an observation magnification of 1000 times, and a working distance (WD) of 25 mm and a lower secondary electron detector for the detection of secondary electrons.

The obtained SEM image was read by image analysis software (WinROOF manufactured by MITANI SHOJI Co., Ltd.). Next, using an arbitrary shape selection tool, the region in the outer peripheral portion of the graphite particle spherical aggregate was selected to determine the particle area. That is, as shown in the SEM image on the right side of FIG. 2, the region in the outer periphery of the graphite particle spherical aggregate shown in the center portion was selected using an arbitrary shape selection tool to determine the particle area.

Thereafter, the diameter of a circle having the same area as the selected region (particle area) was determined as the circle equivalent diameter.

Further, 500 particles of graphite particle spherical aggregates having a circle equivalent diameter of 10 µm or more were arbitrarily selected. Next, the region in the outer peripheral portion of the largest particle among flat graphite particles that can be observed on the outermost surface of each graphite particle spherical aggregate was selected using an arbitrary shape selection tool. That is, as shown in the SEM image on the right side of FIG. 2, the region in the outer periphery of the flat graphite particle constituting the graphite particle spherical aggregate shown in the center portion as the outer peripheral portion of the largest particle among flat graphite particles that can be observed on the outermost surface was selected using an arbitrary shape selection tool. Thereafter, the diameter of a circle having the same area as the selected region (particle area) was determined as the circle equivalent diameter, and the proportion thereof (small particle abundance proportion: %) was calculated by the following formula.

Small particle (2 to 12 µm) abundance proportion (%)=the number of the graphite particle spherical aggregates in which the largest flat graphite particle observed on the outermost surface has a circle equivalent diameter of 2 µm to 12 µm/500 (total number of graphite particle spherical aggregates having a circle equivalent diameter of 10 µm or more)

Small particle (4 to 12 μm) abundance proportion (%)=the number of the graphite particle spherical aggregates in which the largest flat graphite particle observed on the outermost surface has a circle equivalent diameter of 4 μm to 12 μm/500 (total number of graphite particle spherical aggregates having a circle equivalent diameter of 10 μm or more)

(Measurement of Final Electrode Plate Density, Electrode Plate Orientation Ratio Before Pressing, and Electrode Plate Orientation Ratio)

(1) Production of Electrode Sheet

An organic binder polyvinylidene fluoride (PVDF) dissolved in N-methyl-2pyrrolidone in an amount of 10 weight % in solid content was added to the obtained graphite particle spherical aggregate powder in an amount of 90 weight %, and the mixture was stirred and mixed to prepare a negative electrode mixture paste.

The obtained negative electrode mixture paste was applied onto a copper foil (current collector) having a thickness of 18 μm with a doctor blade, and then heated to 130° C. in vacuum to completely volatilize the solvent, thereby obtaining an electrode sheet having a basis weight of 15.0±0.4 mg/cm$^2$.

Here, the basis weight means the weight of the graphite particle spherical aggregate powder per unit area of the electrode sheet.

(2) Measurement of Final Electrode Plate Density

The electrode sheet was cut into strips having a width of 5 cm and rolled by a roller press at a linear pressure of 3000 kg/5 cm. The pressed electrode sheet was punched into 5 coin-shaped parts having a diameter of 1.62 cm, and the electrode plate densities were calculated from each of the weights A (g) and the thicknesses B (cm) of the center portions of punched coin-shaped parts by the following formula, and the arithmetic mean value thereof was determined as the final electrode plate density.

Electrode plate density (g/cm$^3$)={(A (g)−copper foil weight (g))×weight proportion of graphite particle spherical aggregate powder in negative electrode mixture layer (0.9)}/{(B (cm)−copper foil thickness (cm))×punching area (cm$^2$)}

(3) Measurement of Electrode Plate Orientation Ratio Before Pressing and Electrode Plate Orientation Ratio The electrode plate orientation ratio before pressing and the electrode plate orientation ratio are defined as intensity ratios I(110)/I(004) between peaks derived from carbon (110) plane and carbon (004) plane, which are obtained by, using an X-ray diffractometer, measuring the electrode sheet before and after pressing, respectively.

The electrode sheet obtained in (1) or the electrode sheet pressed in (2) was fixed on a glass plate with double-sided tape, and the wide-angle X-ray diffraction curve was measured using CuKα rays monochromated with a graphite monochromator using an X-ray diffractometer (Ultima IV manufactured by Rigaku Corporation). The slits and measurement conditions are as follows. Here, 2θ represents the diffraction angle.

Slit: Divergence slit=2/3 degrees, Light receiving slit=0.15 mm, Scattering slit=2/3 degrees Measuring range and step angle/measuring time:
(110) plane: 76.0 degrees ≤2θ≤79.0 degrees 0.01 degrees/3 seconds
(004) plane: 53.0 degrees ≤2θ≤56.0 degrees 0.01 degrees/3 seconds The obtained chart was subjected to fitting by using a split pseudo-Voigt function as a profile function to separate the peaks, and the integrated intensities of the peaks from the (110) plane and the (004) plane were calculated. Next, the ratio of the diffraction intensity from the (110) plane to the diffraction intensity from the (004) plane (electrode plate orientation ratio I(110)/I(004)) was determined. The measurement was repeated 5 times, and the arithmetic mean value of the diffraction intensity ratios (electrode plate orientation ratio I(110)/I(004)) was determined as the electrode plate density.

<Production and Evaluation of Lithium-Ion Secondary Battery>

A lithium-ion secondary battery was produced using the obtained graphite particle spherical aggregate powder, and battery evaluation was performed.

(Production of Electrode Sheet for Negative Electrode)

An organic binder polyvinylidene fluoride (PVDF) dissolved in N-methyl-2pyrrolidone in an amount of 10 weight % in solid content was added to the obtained graphite particle spherical aggregate powder in an amount of 90 weight %, and the mixture was stirred and mixed to prepare a negative electrode mixture paste. The obtained negative electrode mixture paste was applied onto a copper foil (current collector) having a thickness of 18 μm with a doctor blade, and then heated to 130° C. in vacuum to completely volatilize the solvent, thereby obtaining an electrode sheet.

The obtained electrode sheet was rolled with a roller press and adjusted so that the density of the mixture layer of graphite particles and PVDF was 1.5 g/cm$^3$.

(Production of Lithium-Ion Secondary Battery)

The above electrode sheet was punched with a punch to produce a 2 cm$^2$ negative electrode (working electrode). Further, a lithium metal foil was forced into a nickel mesh having a thickness of 270 μm (current collector, punched using a punch) in an inert atmosphere to produce a positive electrode (counter electrode).

The electrolytic solution used was prepared by the following procedures (i) to (iii):

(i) as a solvent, a solution in which ethylene carbonate (EC) and diethyl carbonate (DEC) are mixed at a volume ratio of 1:1 is prepared;

(ii) lithium salt LiPF$_6$ as an electrolyte is dissolved in the solution obtained in (i) at a concentration of 1 mol/dm$^3$; and (iii) 1 weight % of vinylene carbonate is added as an additive to the solution of (ii).

Figure 1:
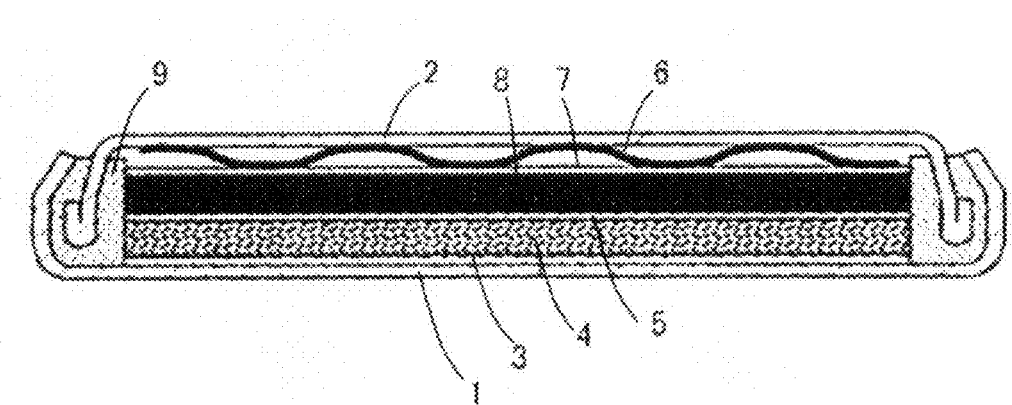
FIG. 1 is a vertical cross-sectional view for explaining a structure of a button-type lithium-ion secondary battery using graphite powders obtained in Examples and Comparative Examples of the present invention.

As shown in FIG. 1, a positive electrode 4 (counter electrode) forced into the above nickel mesh (current collector) 3, a separator 5, the above negative electrode (working electrode) 8, and a spacer 7 were stacked inside a case 1 in an inert atmosphere, and sealed using a lid (cap) 2 through a spring 6 to produce a total of six button-type lithium-ion secondary batteries for evaluation having a morphology shown in FIG. 1.

(Battery Evaluation Method)

An obtained lithium-ion secondary battery for evaluation was charged with a constant current at 0.405 mA (final voltage: 5 mV), and then held at a constant potential until the lower limit current reached 0.0405 mA. Next, the obtained lithium-ion secondary battery for evaluation was discharged at a constant current of 0.405 mA (final voltage: 1.5 V), and the discharge capacity after completion of one cycle was taken as the rated capacity (reversible capacity (mAh/g)). The above measurement was performed for each of the six batteries, and the arithmetic mean value of the discharge capacities after the completion of one cycle was determined as the initial discharge capacity (mAh/g).

Further, the initial efficiency was calculated by the following formula from the first charge capacity and discharge capacity, and the arithmetic mean value of those of the six batteries was determined as the initial efficiency (%).

Initial efficiency (%)=(first discharge capacity (mAh/g)/ first charge capacity (mAh/g))×100

The results are shown in Table 2.

Example 2

Using the graphite particle spherical aggregate powder obtained in Example 1, a lithium-ion secondary battery for evaluation was produced in the same manner as in Example 1.

For the obtained lithium-ion secondary battery, battery evaluation was performed in the same manner as in Example 1 except that the final voltage was changed from 1.5 V to 3.0 V.

The results are shown in Table 2.

Example 3

A graphite particle spherical aggregate powder was produced under the same conditions as in Example 1 except that coal-based needle coke B (ash content 0.01 mass %, volatile content 4.35 mass %) was used instead of coal-based needle coke A and evaluated in the same manner as in Example 1, and a lithium-ion secondary battery was produced in the same manner as in Example 1 using the obtained graphite particle spherical aggregate powder, and evaluated in the same manner.

At this time, the number-based proportion of the graphite particle spherical aggregates having a circle equivalent diameter of 10 μm or more contained in the graphite particle spherical aggregate powder (the mass of graphite particle spherical aggregates) specified by scanning electron microscope (SEM) observation was 69%.

Figure 3:
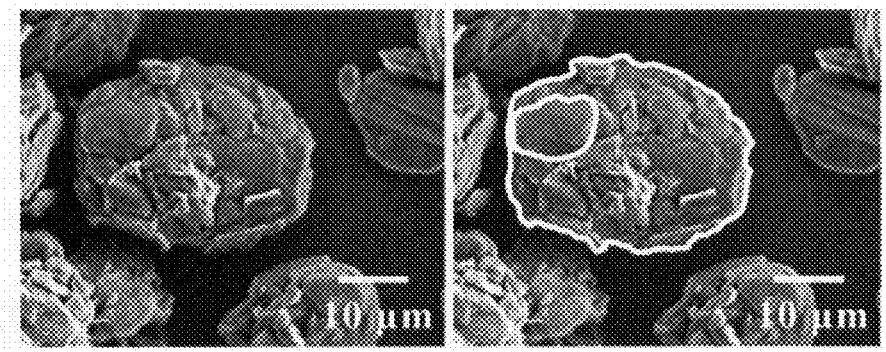
FIG. 3 is a scanning electron microscope (SEM) image of a graphite particle spherical aggregate obtained in an example of the present invention.

FIG. 3 shows a scanning electron microscope (SEM) image of the obtained graphite particle spherical aggregates.

The SEM images shown on the left side and the right side of FIG. 3 are the same, but the SEM image shown on the right side of FIG. 3 shows the outline when the region in the outer peripheral portion of the graphite particle spherical aggregate shown in the center portion is selected to determine the area when the morphology of the graphite particle spherical aggregate is specified by the SEM observation.

Further, the SEM image shown on the right side of FIG. 3 shows the outline when the region in the outer peripheral portion of the flat graphite particle constituting the graphite particle spherical aggregate shown in the center portion as the largest particle among flat graphite particles that can be observed on the outermost surface of the graphite particle spherical aggregate was selected to determine the area.

The evaluation results are shown in Tables 1 and 2.

Example 4

A graphite particle spherical aggregate powder was prepared under the same conditions as in Example 1 except that the binder was changed to soaked pitch (viscosity at 150° C.: 189 mPa·s, actual carbon ratio: 34%), and 100 parts by weight of coke fine particles and 30 parts by weight of a binder formed of the soaked pitch were granulated while keeping the temperature at 150° C. in Example 1, and evaluated in the same manner as in Example 1, and a lithium-ion secondary battery was produced in the same manner as in Example 1 using the obtained graphite particle spherical aggregate powder, and evaluated in the same manner.

At this time, the number-based proportion of the graphite particle spherical aggregates having a circle equivalent diameter of 10 μm or more contained in the graphite particle spherical aggregate powder (the mass of graphite particle spherical aggregates) specified by scanning electron microscope (SEM) observation was 62%.

Figure 4:
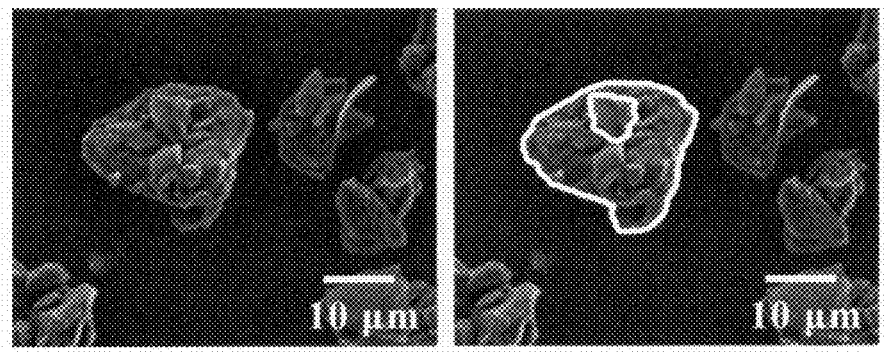
FIG. 4 is a scanning electron microscope (SEM) image of a graphite particle spherical aggregate obtained in an example of the present invention.

FIG. 4 shows a scanning electron microscope (SEM) image of the obtained graphite particle spherical aggregates.

The SEM images shown on the left side and the right side of FIG. 4 are the same, but the SEM image shown on the right side of FIG. 4 shows the outline when the region in the outer peripheral portion of the graphite particle spherical aggregate shown in the center portion is selected to determine the area when the morphology of the graphite particle spherical aggregate is specified by the SEM observation.

Further, the SEM image shown on the right side of FIG. 4 shows the outline when the region in the outer peripheral portion of the flat graphite particle constituting the graphite particle spherical aggregate shown in the center portion as the largest particle among flat graphite particles that can be observed on the outermost surface of the graphite particle spherical aggregate was selected to determine the area.

The evaluation results are shown in Tables 1 and 2.

Example 5

A graphite particle spherical aggregate powder was produced under the same conditions as in Example 1 except that coke fine particles having an average particle size of 5.1 μm obtained by finely pulverizing coal-based needle coke B (ash content 0.01 mass %, volatile content 4.35 mass %) with a high-speed rotor type fine pulverizer were used instead of coke fine particles obtained by finely pulverizing the coal-based needle coke A, and 100 parts by weight of coke fine particles and 35 parts by weight of binder were used instead of 100 parts by weight of coke fine particles and 30 parts by weight of binder, and evaluated in the same manner as in Example 1, and a lithium-ion secondary battery was produced in the same manner as in Example 1 using the obtained graphite particle spherical aggregate powder and evaluated in the same manner.

At this time, the number-based proportion of the graphite particle spherical aggregates having a circle equivalent diameter of 10 μm or more contained in the graphite particle spherical aggregate powder (the mass of graphite particle spherical aggregates) specified by scanning electron microscope (SEM) observation was 52%.

Figure 5:
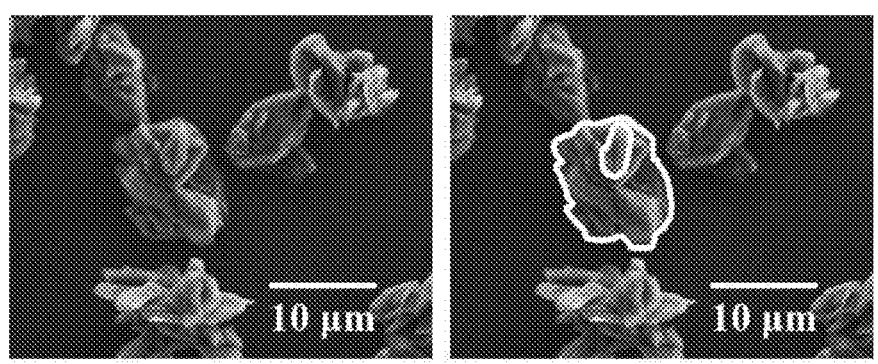
FIG. 5 is a scanning electron microscope (SEM) image of a graphite particle spherical aggregate obtained in an example of the present invention.

FIG. 5 shows a scanning electron microscope (SEM) image of the obtained graphite particle spherical aggregates.

The SEM images shown on the left side and the right side of FIG. 5 are the same, but the SEM image shown on the right side of FIG. 5 shows the outline when the region in the outer peripheral portion of the graphite particle spherical aggregate shown in the center portion is selected to determine the area when the morphology of the graphite particle spherical aggregate is specified by the SEM observation.

Further, the SEM image shown on the right side of FIG. 5 shows the outline when the region in the outer peripheral portion of the flat graphite particle constituting the graphite particle spherical aggregate shown in the center portion as the largest particle among flat graphite particles that can be observed on the outermost surface of the graphite particle spherical aggregate was selected to determine the area.

The evaluation results are shown in Tables 1 and 2.

Comparative Example 1

As a graphite material corresponding to the graphite material described in Patent Literature 1, the following material was prepared.

Petroleum-based mosaic coke (ash content 0.46 mass %, volatile content 12.55 mass %) was finely pulverized using a turbo mill manufactured by MATSUBO Corporation, heat-treated at 1000° C. in a non-oxidizing atmosphere, and then heat-treated at 3000° C. or higher in an Atchison furnace to obtain graphitized powder, and the obtained graphitized powder was evaluated in the same manner as in Example 1, and a lithium-ion secondary battery was produced in the same manner as in Example 1 using the obtained graphitized powder and evaluated in the same manner.

At this time, the number-based proportion of the graphite particle spherical aggregates having a circle equivalent diameter of 10 μm or more contained in the graphite particle spherical aggregate powder (the mass of graphite particle spherical aggregates) specified by scanning electron microscope (SEM) observation was 38%.

Figure 6:
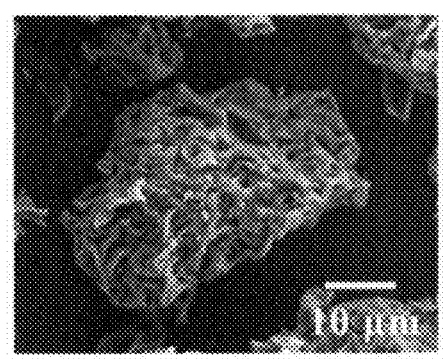
FIG. 6 is a scanning electron microscope (SEM) image of a graphite powder obtained in a comparative example of the present invention.

FIG. 6 shows a scanning electron microscope (SEM) image of the obtained graphitized powder.

The evaluation results are shown in Tables 1 and 2.

Comparative Example 2

As a graphite material corresponding to the graphite material described in Patent Literature 2, the following material was prepared.

To 100 parts by weight of petroleum-based needle coke (ash content 0.01 mass %, volatile content 4.35 mass %) used in Example 3, 40 parts by weight of tar and 10 parts by weight of silicon carbide as a graphitization catalyst were added, the mixture was kneaded in a kneader, heat-treated at 1000° C. in a non-oxidizing atmosphere, and then heat-treated at 2800° C. or higher in an Acheson furnace, the obtained graphitic lump was finely pulverized to obtain graphite aggregate powder, and the obtained graphitized powder was evaluated in the same manner as in Example 1, and a lithium-ion secondary battery was produced as in Example 1 using the obtained graphite aggregate powder and evaluated in the same manner.

At this time, the number-based proportion of the graphite particle spherical aggregates having a circle equivalent diameter of 10 μm or more contained in the graphite particle spherical aggregate powder (the mass of graphite particle spherical aggregates) specified by scanning electron microscope (SEM) observation was 46%.

Figure 7:
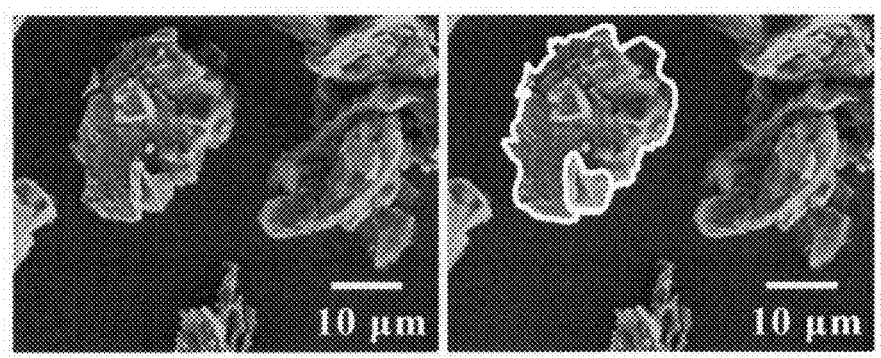
FIG. 7 is a scanning electron microscope (SEM) image of a graphite aggregate powder obtained in a comparative example of the present invention.

FIG. 7 shows a scanning electron microscope (SEM) image of the obtained graphite aggregate powder.

The SEM images shown on the left side and the right side of FIG. 7 are the same, but the SEM image shown on the right side of FIG. 7 shows the outline when the region in the outer peripheral portion of the graphite aggregate powder shown in the substantially center portion is selected to determine the area when the morphology of the graphite aggregate powder is specified by the SEM observation. Further, the SEM image shown on the right side of FIG. 7 shows the outline when the region in the outer peripheral portion of the flat graphite particle constituting the graphite particle spherical aggregate shown in the substantially center portion as the largest particle among flat graphite particles that can be observed on the outermost surface of the graphite aggregate powder was selected to determine the area.

The evaluation results are shown in Tables 1 and 2.

Comparative Example 3

To 100 parts by weight of spheroidized natural graphite, 10 parts by weight of binder pitch were added, mixed with a Henschel mixer while keeping the temperature at 150° C., heat-treated at 1000° C. in a non-oxidizing atmosphere, and then finely pulverized to obtain carbonaceous particles, the obtained carbonaceous powder was evaluated in the same manner as in Example 1, and a lithium-ion secondary battery was produced in the same manner as in Example 1 using the obtained carbonaceous powder and evaluated in the same manner.

At this time, the number-based proportion of the graphite particle spherical aggregates having a circle equivalent diameter of 10 μm or more contained in the graphite particle spherical aggregate powder (the mass of graphite particle spherical aggregates) specified by scanning electron microscope (SEM) observation was 38%.

Figure 8:
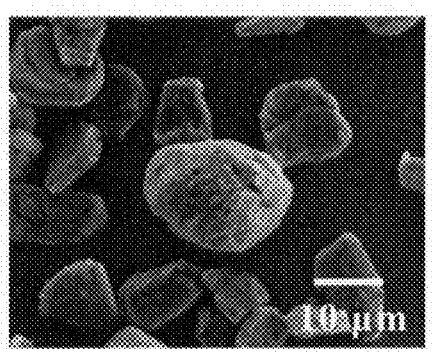
FIG. 8 is a scanning electron microscope (SEM) image of a carbonaceous powder obtained in a comparative example of the present invention.

FIG. 8 shows a scanning electron microscope (SEM) image of the obtained carbonaceous powder. The evaluation results are shown in Tables 1 and 2.

TABLE 1

|  | $D_{10}$ (μm) | $D_{50}$ (μm) | $D_{90}$ (μm) | $D_{90}/D_{10}$ | SPAN | SA ($m^2/g$) | Tapped density ($g/cm^3$) | Average circularity |
|---|---|---|---|---|---|---|---|---|
| Example 1 | 13.0 | 19.4 | 28.9 | 2.2 | 0.82 | 1.6 | 1.03 | 0.915 |
| Example 2 | 13.0 | 19.4 | 28.9 | 2.2 | 0.82 | 1.6 | 1.03 | 0.915 |
| Example 3 | 15.5 | 23.1 | 34.7 | 2.2 | 0.83 | 1.4 | 1.01 | 0.913 |
| Example 4 | 9.6 | 15.8 | 26.0 | 2.7 | 0.94 | 1.0 | 0.97 | 0.928 |
| Example 5 | 6.8 | 11.9 | 22.6 | 3.3 | 1.33 | 2.6 | 0.84 | 0.913 |
| Comparative Example 1 | 8.5 | 22.8 | 44.6 | 5.3 | 1.56 | 1.2 | 1.16 | 0.924 |
| Comparative Example 2 | 7.0 | 15.2 | 26.7 | 3.8 | 1.29 | 6.4 | 0.54 | 0.896 |
| Comparative Example 3 | 7.6 | 12.0 | 19.3 | 2.5 | 0.98 | 3.3 | 0.96 | 0.935 |

TABLE 2

|  | $d_{002}$ (nm) | Lc (004) (nm) | Abundance proportion (%) of small particles (4 to 12 μm) | Abundance proportion (%) of small particles (2 to 12 μm) | Electrode plate orientation ratio before pressing | Electrode plate orientation ratio | Final electrode plate density ($g/cm^3$) | Initial efficiency (%) | Initial discharge capacity (mAh/g) |
|---|---|---|---|---|---|---|---|---|---|
| Example 1 | 0.3359 | 57 | 92 | 96 | 0.30 | 0.13 | 1.66 | 94 | 352 |
| Example 2 | 0.3359 | 57 | 92 | 96 | 0.30 | 0.13 | 1.66 | 94 | 366 |
| Example 3 | 0.3358 | 70 | 83 | 87 | 0.24 | 0.10 | 1.72 | 93 | 358 |
| Example 4 | 0.3359 | 62 | 89 | 90 | 0.16 | 0.13 | 1.63 | 93 | 354 |

TABLE 2-continued

|  | $d_{002}$ (nm) | Lc (004) (nm) | Abundance proportion (%) of small particles (4 to 12 μm) | Abundance proportion (%) of small particles (2 to 12 μm) | Electrode plate orientation ratio before pressing | Electrode plate orientation ratio | Final electrode plate density (g/cm$^3$) | Initial efficiency (%) | Initial discharge capacity (mAh/g) |
|---|---|---|---|---|---|---|---|---|---|
| Example 5 | 0.3359 | 72 | 45 | 91 | 0.32 | 0.12 | 1.68 | 92 | 348 |
| Comparative Example 1 | 0.3361 | 79 | 12 | 12 | 0.34 | 0.20 | 1.50 | 92 | 332 |
| Comparative Example 2 | 0.3356 | 201 | 55 | 55 | 0.06 | 0.02 | 1.82 | 94 | 355 |
| Comparative Example 3 | 0.3355 | 164 | 10 | 10 | 0.13 | 0.05 | 1.71 | 92 | 356 |

It is understood from Tables 1 to 2 and FIGS. 2 to 5 that the graphite particle spherical aggregate powders obtained in Examples 1 to 5 include a mass including, with a narrow particle size distribution, graphite particle spherical aggregates having a high circularity formed by aggregating a plurality of flat graphite particles having a specific crystallite size in which flat graphite particles having a certain circle equivalent diameter are observed on the outermost surface when observed by a scanning electron microscope. Therefore, it is understood that when pressed to form an electrode, pressure can be suitably applied to easily increase the density, and it is possible to exert an excellent strength capable of exerting a certain resistance to maintain non-parallel orientation of the flat graphite, as well as to easily form gaps suitable as electrolytic solution flow path between the graphite particle spherical aggregates.

In this case, it is understood that when the proportion of the graphite particle spherical aggregates in which the largest flat particle observed on the outermost surface has a circle equivalent diameter of 4 μm to 12 μm in graphite particle spherical aggregates having a circle equivalent diameter of 10 μm or more is 80% or more, the edge portion of the primary particles can be reduced to ensure smooth contact between the primary particles, side reactions with the electrolytic solution can be suppressed and the initial efficiency and initial discharge capacity can thus be improved. Furthermore, by comparing Example 3 with Example 5, it is understood that when the primary particles constituting the graphite particle spherical aggregate are refined so that the proportion of the graphite particle spherical aggregates in which the largest flat particle observed on the outermost surface has a circle equivalent diameter of 2 μm to 12 μm in graphite particle spherical aggregates having a circle equivalent diameter of 10 μm or more is set to 80% or more, the number of the primary particles constituting the aggregates increases and the orientation of the aggregates can be made more non-parallel.

Further, by comparing the results of Example 1 and Example 2, it is understood that the graphite particle spherical aggregate powders operate as a negative electrode material for a lithium-ion secondary battery while maintaining desired characteristics even in a wide potential window region used in a Si-based negative electrode material, and can be provided as a negative electrode material suitable for a battery that requires higher capacity.

Therefore, it is understood that the graphite particle spherical aggregate powders obtained in Examples 1 to 4 can provide a negative electrode material for a lithium-ion secondary battery with excellent electrolytic solution permeability, which is capable of improving the discharge capacity by increasing the electrode density and improving the cycle characteristics (lifetime characteristics) by achieving high orientation of the electrode plate.

On the other hand, from Tables 1 and 2, it is understood that the graphite material obtained in Comparative Example 1 has a low abundance proportion of small particles and almost no flat graphite on the surface as shown in FIG. 6, and has a very high hardness, and thus has a low electrode plate density and low initial capacity and discharge capacity.

Further, from Tables 1 and 2, it is understood that the graphite material obtained in Comparative Example 2 has a low average circularity and an indefinite shape as shown in FIG. 7, and is very soft, and thus has a low electrode plate orientation ratio and inferior cycle characteristics (lifetime characteristics).

Furthermore, from Tables 1 and 2, it is understood that the carbonaceous material obtained in Comparative Example 3 has a low abundance proportion of small particles and almost no flat graphite on the surface as shown in FIG. 8, and is very soft, and thus has a low electrode plate orientation ratio and inferior cycle characteristics (lifetime characteristics).

INDUSTRIAL APPLICABILITY

According to the present invention, it is possible to provide a negative electrode material for a lithium-ion secondary battery having a sufficient strength capable of exerting a certain amount of resistance to the applied pressure to maintain the electrolytic solution flow path and maintain the non-parallel orientation of the flat graphite constituting the aggregates when pressed during electrode formation while being deformed such that the graphite particle spherical aggregates reach a certain density, and thus capable of increasing the electrode density and the discharge capacity and excellent in cycle characteristics (lifetime characteristics) and to provide a method for producing the negative electrode material for a lithium-ion secondary battery.

The invention claimed is:

1. A negative electrode material for a lithium-ion secondary battery comprising a mass of graphite particle spherical aggregates consisting of a plurality of flat graphite particles aggregated in a spherical shape, wherein the flat graphite particles are a graphitized product of flat particles constituting a green needle coke or calcined needle coke, and wherein the mass of the graphite particle spherical aggregates has:
(i) an average circularity of graphite particle spherical aggregates of 0.900 or more;
(ii) a ratio of 90% cumulative particle size $D_{90}$ in volume-based cumulative particle size distribution to 10% cumulative particle size $D_{10}$ in volume-based cumulative particle size distribution of 2.0 to 3.5;
(iii) a crystallite size Lc (004) in the c-axis direction of graphite constituting the graphite particle spherical aggregates of 40 nm to 100 nm; and
(iv) a proportion of the graphite particle spherical aggregates in which the largest flat graphite particle observed on their outermost surface has a circle equivalent diameter of 2 μm to 12 μm within the graphite particle spherical aggregates having a circle equivalent diameter of 10 μm or more when observed by a scanning electron microscope of 80% or more in terms of number.

2. The negative electrode material for a lithium-ion secondary battery according to claim 1,
wherein the graphite particle spherical aggregate is
(i) a graphitized product of a granulated product of a green needle coke or calcined needle coke and an organic binder in the absence of a graphitization catalyst, or
(ii) a graphitized product of a granulated carbonized product obtained by carbonizing a granulated product of a green needle coke or calcined needle coke and an organic binder in the absence of a graphitization catalyst.

3. A method for producing a negative electrode material for a lithium-ion secondary battery according to claim 1, the method comprising:
(a) a step of mixing a green needle coke or calcined needle coke and an organic binder to obtain a granulated product; and
(b) a step of graphitizing in the absence of a graphitization catalyst, the granulated product or a granulated carbonized product obtained by carbonizing the granulated product to obtain a graphitized product.

4. The method for producing a negative electrode material for a lithium-ion secondary battery according to claim 3, wherein the granulated carbonized product is obtained by heating the granulated product at 500 to 1500° C.

5. The negative electrode material for a lithium-ion secondary battery according to claim 1,
wherein the graphite particle spherical aggregate is
(i) a graphitized product of a granulated product of a green needle coke or calcined needle coke and an organic binder in the absence of a graphitization catalyst, or
(ii) a graphitized product of a granulated carbonized product obtained by carbonizing a granulated product of a green needle coke or calcined needle coke and an organic binder in the absence of a graphitization catalyst.

\* \* \* \* \*